United States Patent
Liemandt et al.

(10) Patent No.: US 11,947,448 B2
(45) Date of Patent: *Apr. 2, 2024

(54) TEST CASE REDUCTION FOR CODE REGRESSION TESTING

(71) Applicant: DEVFACTORY INNOVATIONS FZ-LLC, Dubai (AE)

(72) Inventors: Joseph A. Liemandt, Austin, TX (US); Rahul Subramaniam, Dubai (AE); Samy Aboel-Nil, Austin, TX (US)

(73) Assignee: DEVFACTORY INNOVATIONS FZ-LLC, Dubai (AE)

( * ) Notice: Subject to any disclaimer, the term of this patent is extended or adjusted under 35 U.S.C. 154(b) by 0 days.

This patent is subject to a terminal disclaimer.

(21) Appl. No.: 17/867,337

(22) Filed: Jul. 18, 2022

(65) Prior Publication Data

US 2022/0358029 A1  Nov. 10, 2022

Related U.S. Application Data

(63) Continuation of application No. 17/182,028, filed on Feb. 22, 2021, now Pat. No. 11,422,923, which is a continuation of application No. 16/449,114, filed on Jun. 21, 2019, now Pat. No. 10,956,308, which is a continuation of application No. 14/210,627, filed on Mar. 14, 2014, now Pat. No. 10,380,004.

(60) Provisional application No. 61/794,260, filed on Mar. 15, 2013.

(51) Int. Cl.
  *G06F 11/36*  (2006.01)
(52) U.S. Cl.
  CPC ...... *G06F 11/3672* (2013.01); *G06F 11/3688* (2013.01)

(58) Field of Classification Search
  USPC .......................................................... 717/124
  See application file for complete search history.

(56) References Cited

U.S. PATENT DOCUMENTS

| | | | | |
|---|---|---|---|---|
| 5,673,387 A | * | 9/1997 | Chen | G06F 11/3676 707/999.203 |
| 6,536,036 B1 | * | 3/2003 | Pavela | G06F 11/3676 717/125 |

(Continued)

OTHER PUBLICATIONS

Orso, et al.; "Using Component Metacontent to Support the Regression Testing of Component-Based Software"; Proceedings IEEE International Conference on Software Maintenance (ICSM 2001) (pp. 716-725); 2001 (Year: 2001).*

(Continued)

*Primary Examiner* — Qing Chen
*Assistant Examiner* — Clint Thatcher
(74) *Attorney, Agent, or Firm* — Kent B. Chambers; Terrile, Cannatti & Chambers, LLP

(57) ABSTRACT

In at least one embodiment, a system performs regression testing of software using selected test cases. In at least one embodiment, the system selects the test case for regression testing based on whether the test case correlates with modified code. In at least one embodiment, a test case correlates with the modified code if the test case tests all or a proper subset of the modified code. In at least one embodiment, if a test case does not test any of the modified code, then the test case is not used in the regression testing of the modified code.

16 Claims, 19 Drawing Sheets

(56) References Cited

U.S. PATENT DOCUMENTS

| | | | | |
|---|---|---|---|---|
| 7,614,042 B1* | 11/2009 | Hardy | ................ | G06F 11/3688 717/124 |
| 7,950,004 B2* | 5/2011 | Vieira | ................ | G06F 11/3688 714/25 |
| 8,205,191 B1* | 6/2012 | Kolawa | ................ | G06F 11/368 717/124 |
| 8,276,123 B1* | 9/2012 | Deng | ................ | G06F 11/368 717/124 |
| 10,678,666 B1* | 6/2020 | Gauf | ................ | G06F 11/2635 |
| 2002/0147942 A1* | 10/2002 | Moe | ................ | G06F 11/3688 714/38.1 |
| 2003/0204836 A1* | 10/2003 | Srivastava | ......... | G06F 11/3676 717/124 |
| 2003/0212924 A1* | 11/2003 | Avvari | ................ | G06F 11/3676 714/E11.208 |
| 2005/0044533 A1* | 2/2005 | Nesbit | ................ | G06F 11/3688 717/124 |
| 2008/0148247 A1* | 6/2008 | Galler | ................ | G06F 11/3684 717/154 |
| 2009/0158255 A1* | 6/2009 | Yoon | ................ | G06F 11/3672 717/124 |
| 2009/0265693 A1* | 10/2009 | Bakowski | ......... | G06F 11/3688 717/131 |
| 2009/0265694 A1* | 10/2009 | Bakowski | ......... | G06F 11/3676 717/131 |
| 2011/0231708 A1* | 9/2011 | Lawrance | ......... | G06F 11/3684 714/E11.217 |
| 2013/0159774 A1* | 6/2013 | Budnik | ................ | G06F 11/3688 714/33 |
| 2015/0026664 A1* | 1/2015 | Bartley | ................ | G06F 11/3676 717/124 |
| 2015/0220426 A1* | 8/2015 | Spektor | ................ | G06F 8/71 717/131 |
| 2021/0042217 A1* | 2/2021 | Hwang | ................ | G06F 11/3604 |

OTHER PUBLICATIONS

Notice of Allowance dated Apr. 18, 2022, filed in U.S. Appl. No. 17/182,028 pp. 1-5.

Terminal Disclaimer filed Apr. 6, 2022, filed in U.S. Appl. No. 17/182,028 pp. 1-2.

Terminal Disclaimer approved Apr. 6, 2022, filed in U.S. Appl. No. 17/182,028 p. 1.

Response to Non-Final Office Action filed Apr. 4, 2022, filed in U.S. Appl. No. 17/182,028 pp. 1-8.

Non-Final Office Action dated Nov. 3, 2021, filed in U.S. Appl. No. 17/182,028 pp. 1-10.

* cited by examiner

TEST CASE REDUCTION FOR CODE REGRESSION TESTING

CROSS-REFERENCE TO RELATED APPLICATION

This application claims the benefit under 35 U.S.C. § 119(e) and 37 C.F.R. § 1.78 of U.S. Provisional Application No. 61/794,260, filed Mar. 15, 2013, which is incorporated by reference in its entirety.

BACKGROUND OF THE INVENTION

Field of the Invention

The present invention relates in general to the field of electronics, and more specifically to computer software testing and selectively executing test cases to reduce overall test case execution.

Description of the Related Art

Testers often test computer software using a suite of test cases. Test cases are also often referred to as test scripts. The test cases often include a set of conditions or variables, and the tester tests the computer software in accordance with the test cases. Generally, the test case provides a known input with an expected output, and the tester determines if the computer software passes or fails based on whether the computer software respectively produced the expected output or another output.

Testers test computer software when certain conditions occur. An exemplary condition is when computer software is modified either through the addition of new code or the revision of existing code. Regression testing tests the computer software in accordance with test cases to determine whether the modified computer software produces the correct predetermined behavior despite the changes made to the code. Since computer software frequently change during the process of development for initial and new versions, regression testing also often occurs frequently. Any product that invests in exhaustive regression testing invariably has a very large automated regression test suite of test cases. The objective of this test suite is that it can be executed with every code modification to identify potential regressions, i.e. errors.

FIG. 1 depicts computer software development and testing system 100, which performs exhaustive test case regression testing. A software developer utilizes computer 102 to develop code 104. From computer 102, the developer performs a code check-in 106 to check the code 104 into computer system 108. The code 104 is all or part of software 110. Computer system 108 includes a source control system 109 that assigns a new revision number to the software 110 to provide version control and stores each version of the software 110 in a file versioning repository memory 111 of the computer system 108. The source control system 109 sends CHECK_IN data to notify a regression testing system 111 of computer system 113 when code 104 is checked-in. The CHECK_IN data provides specific details associated with the code check-in. Exemplary CHECK_IN data includes:

Identification of the user who checked in the code 104;
The files of code 104 that were checked in;
The check in time;
The assigned revision number; and
Identification of the repository in which the code 104 was checked in.

The source control system 109 is a software program executed by the computer system 108, and the regression testing system 111 is a software program executed by the computer system 113.

The regression testing system 111 performs regression testing to determine whether the code 104 caused any functional or other errors in the software 110. Regression testing can involve one or more large test suites that typically have thousands of test cases and can take between 2 and 30 minutes each to run. Regression testing system and process 112 includes a test suite 114, and test suite 114 includes N test cases, where N is an integer representing the number test cases in test suite 114. The regression system and process 112 is incorporated as data and applications in computer system 108. Regression testing process 116 runs each of the N test cases in test suite 114. For large values of N, such as greater than 100, when each test case 1 through N runs serially in computer system 108, the regression test suite 114 may take in excess of 48 hours to run. Running regression test suite 114 serially can, thus, take a significant amount of time. Utilizing parallel processing, by adding one or more additional computer systems to computer system 108 to run all or a subset of the test cases in parallel, reduces regression testing time but can increase costs significantly. The results data 118 contains the results of the regression testing.

Thus, conventional regression testing is costly either in terms of time, cost, or both. However, without regression testing, computer software can produce errors that may not be caught and/or understood until actual deployment.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

Figure 4A:
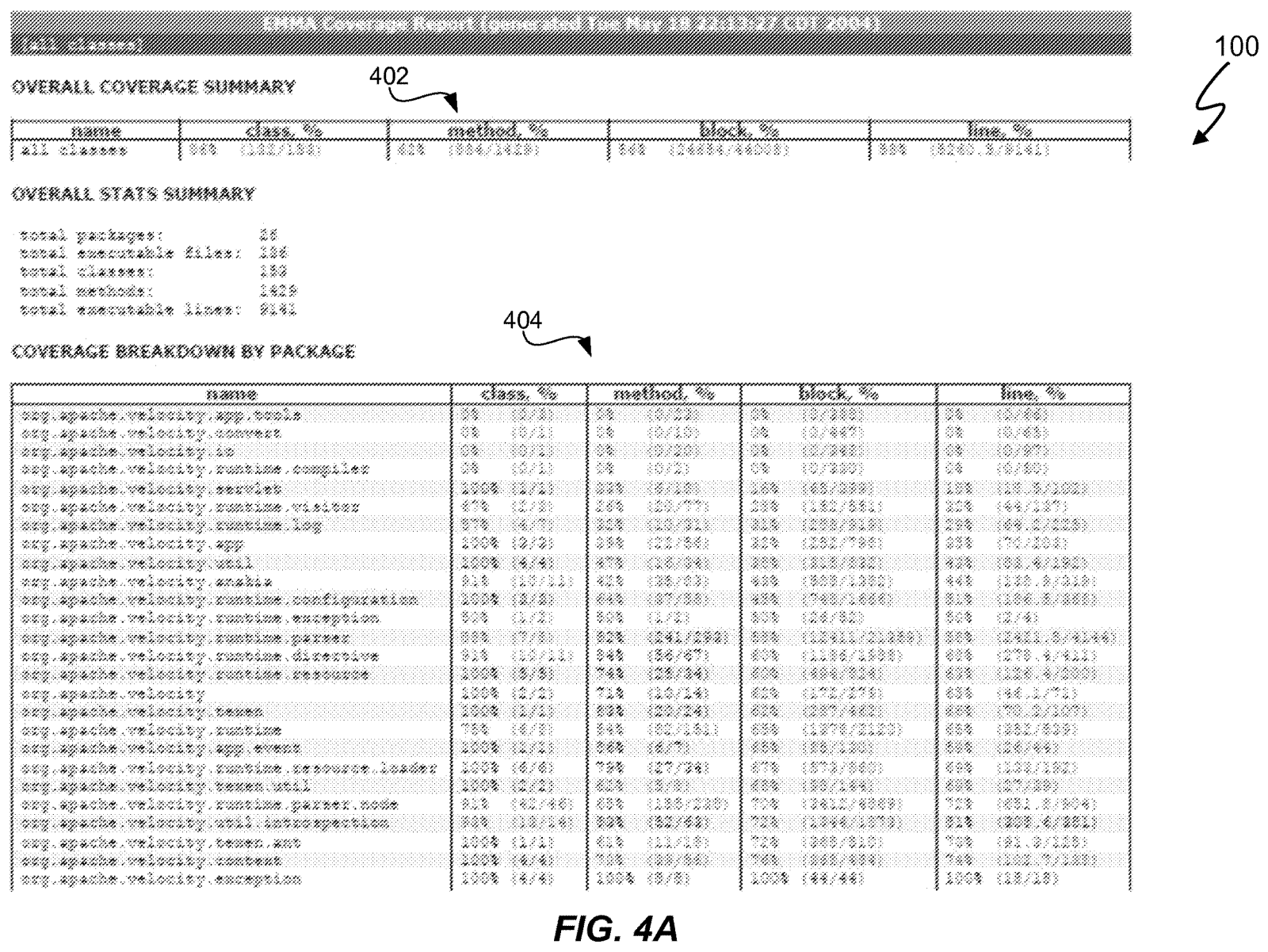
Figure 4B:
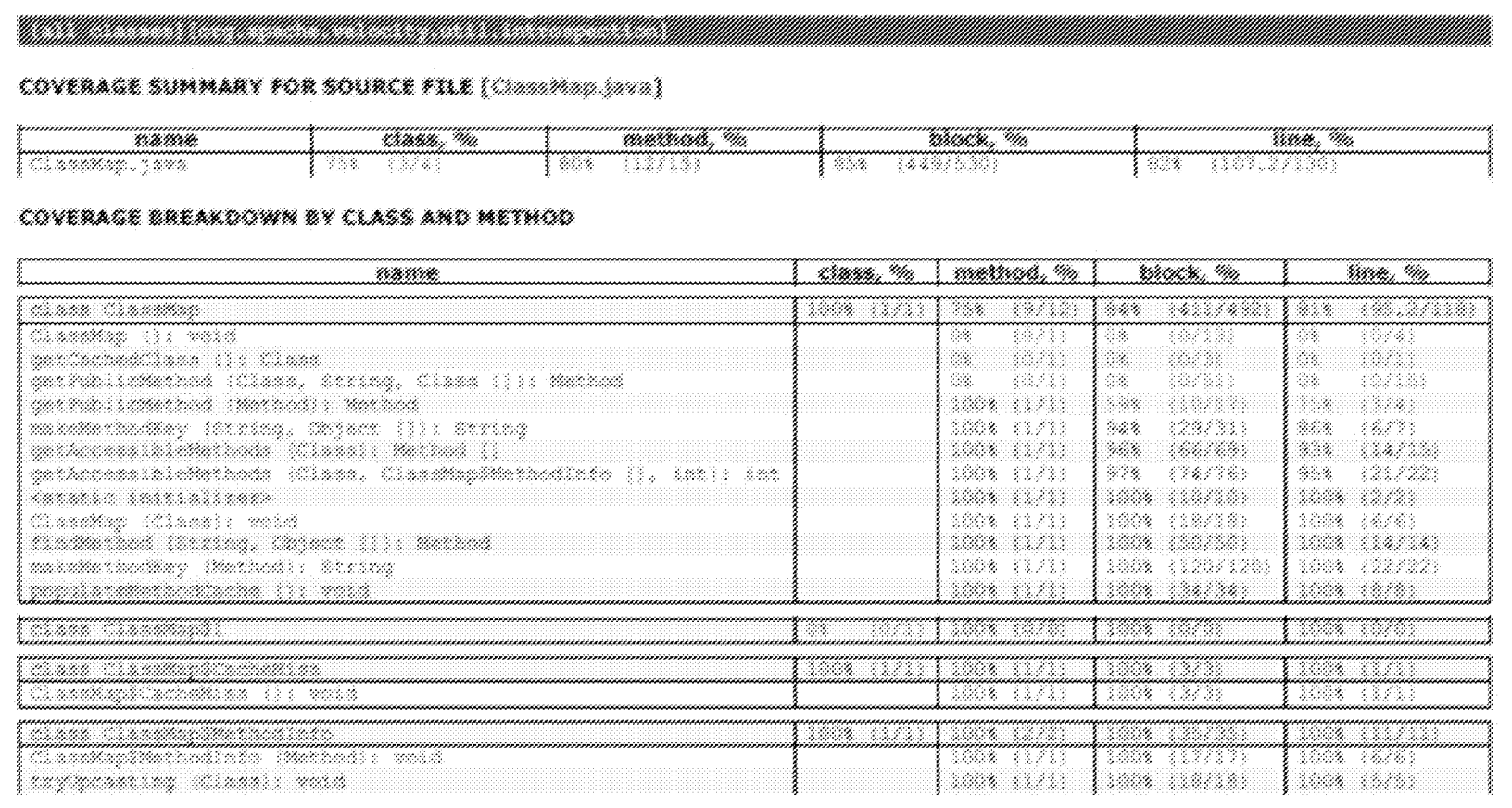
Figure 4F:
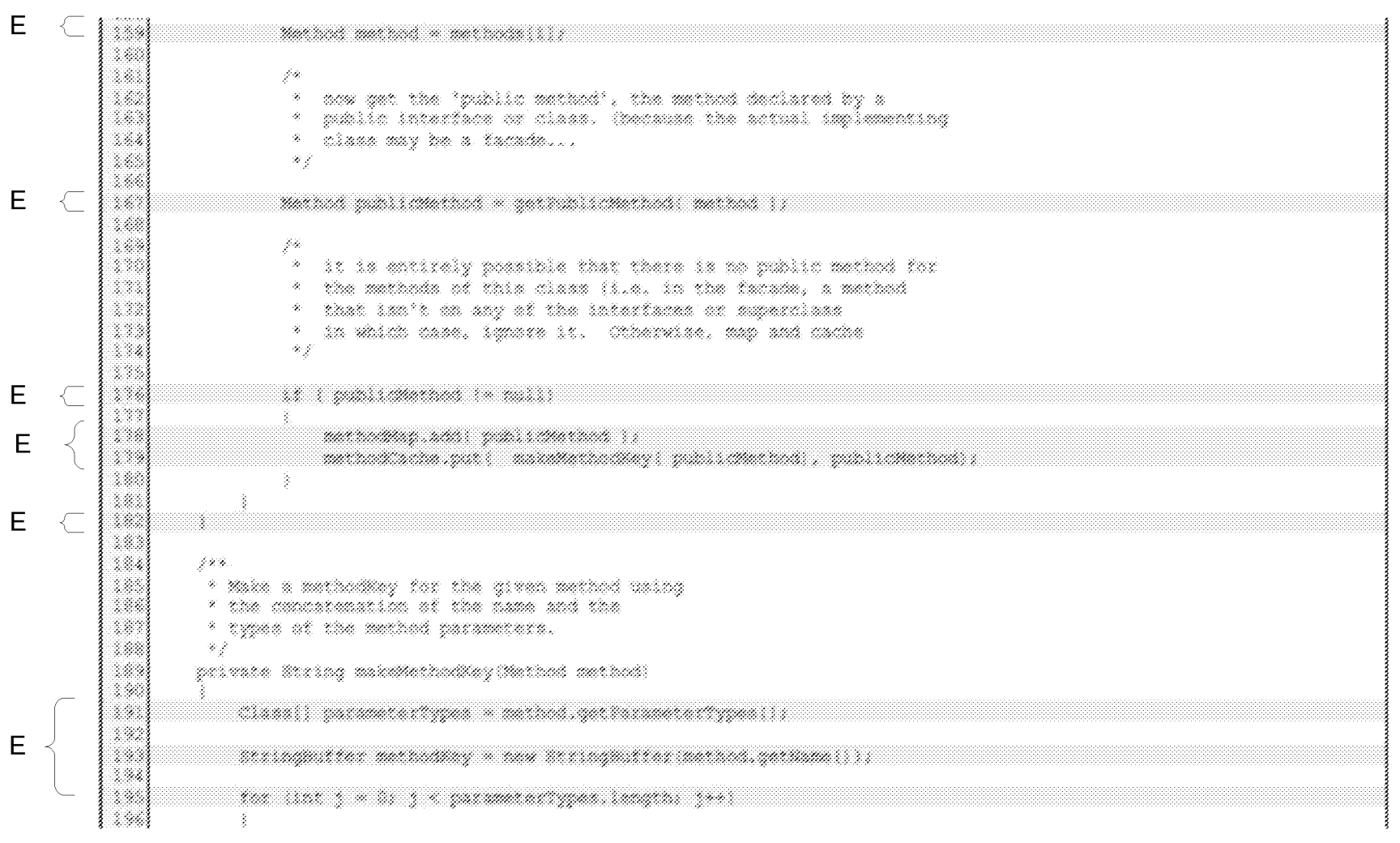

FIGS. 4A-4M (collectively referred to as FIG. 4) depict an exemplary, partial code coverage determination result.

DETAILED DESCRIPTION

In at least one embodiment, a system performs regression testing of software using selected test cases. In at least one embodiment, the system selects the test case for regression testing based on whether the test case correlates with modified code. In at least one embodiment, a test case correlates with the modified code if the test case tests all or a proper subset of the modified code. In at least one embodiment, if a test case does not test any of the modified code, then the test case is not used in the regression testing of the modified code.

In at least one embodiment, the portions of code that correlate with each test case are identified, and data representing the test case-to-code correlation is stored. In at least one embodiment, after modification of one or more code portions of computer software, the system determines which of the one or more portions of code of the computer software were modified. The system then accesses the test case-to-code correlation data and identifies which of the one or more test cases correlate with the one or more portions of code that were modified. After the identification, the system tests the computer software using the one or more identified test cases and generates test result data.

Figure 1:
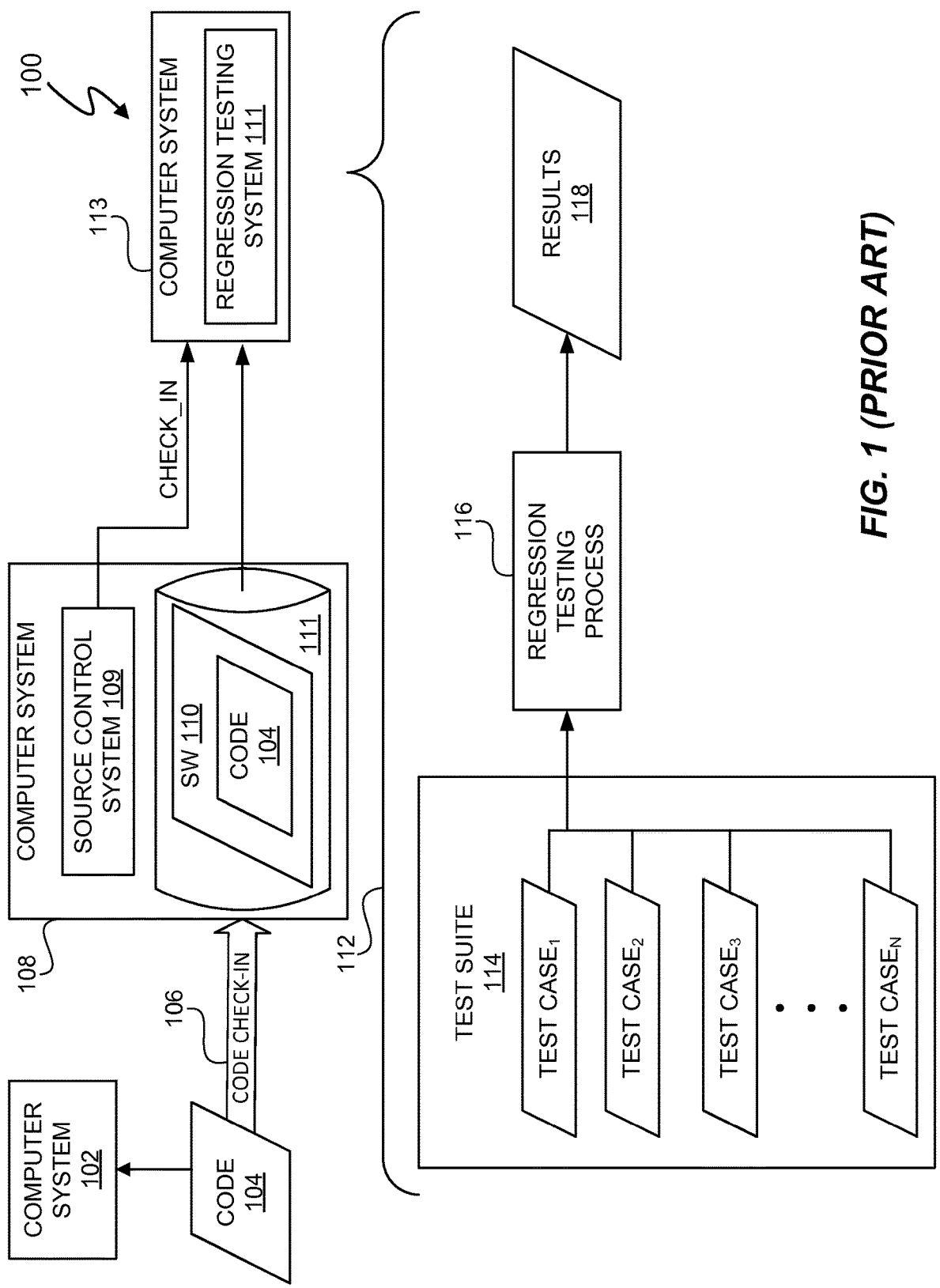
FIG. 1 (labeled prior art) depicts a computer software development and testing system with exhaustive test case regression testing.
Figure 2:
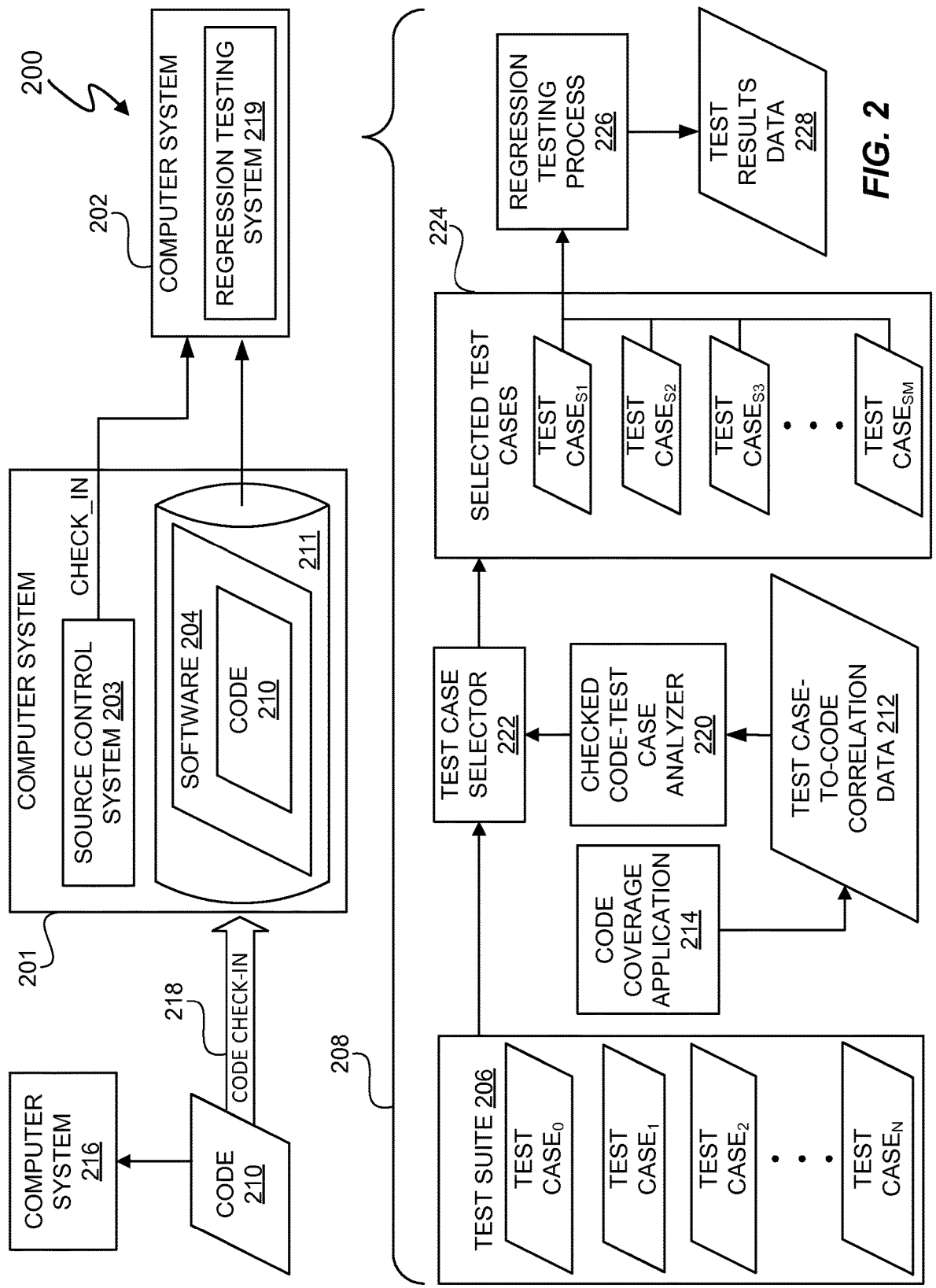
FIG. 2 depicts a computer software development and testing system with selective test case regression testing.

FIG. 2 depicts computer software development and testing system 200, which performs selective test case regression testing. The computer software development and testing system 200 includes a computer system 201, which may be any type of computer system such as a server. The computer system 201 includes a source control system 203 to manage changes in software 204. The source control system 203 can include any type of source code control application, such as Apache Subversion (SVN) from the Apache Software Foundation. Git from www.git-scm.com, Clearcase from International Business Machines of Armonk, NY, Integrity from PTC Integrity with offices in Chicago, IL, Visual Source Safe by Microsoft Corp. of Redmond, WA, and the Polytron Version Control System (PVCS) from Polytron Corp. from Serena Software, Inc. of San Mateo, CA From computer system 216, a developer performs a code check-in 218 to check the code 210 into computer system 201. The code 210 is all or part of software 204. The source control system 203 assigns a new revision number to the code 210 to provide version control and stores each version of the code 210 in a file versioning repository memory 211 of the computer system 201. The source control system 203 sends CHECK_IN data to notify a regression testing system 219 of computer system 202 when code 210 is checked-in. The CHECK_IN data provides specific details associated with the code check-in. Exemplary CHECK_IN data includes:

Identification of the user who checked in the code 210;
The files of code 210 that were checked in;
The check in time;
The assigned revision number; and
Identification of the repository in which the code 104 was checked in.

The source control system 203 is a software program executed by the computer system 201, and, in at least one embodiment, the regression testing system 219 is a software program executed by the computer system 202. In at least one embodiment, the source control system 203 and the regression testing system 219 are software programs executed by the same computer system, such as computer system 201.

The computer system 202 has access to test suite 206. Test suite 206 is stored in a non-transitory computer readable medium such as any type of memory device. The bracket 208 indicates that elements below the bracket 208 are accessible to and, in at least one embodiment, are part of the regression testing system 219.

In at least one embodiment, the computer software development and testing system 200 performs selective test case regression testing by identifying and using test cases in test suite 206 that correlate with the one or more portions of checked-in modified code 210. In at least one embodiment, the computer system 202 generates the test case-to-code correlation data; however, any computer system that can test the software with the test suite 206 identify test-case-to-code correlation can generate the test case-to-code correlation data 212.

Figure 3:
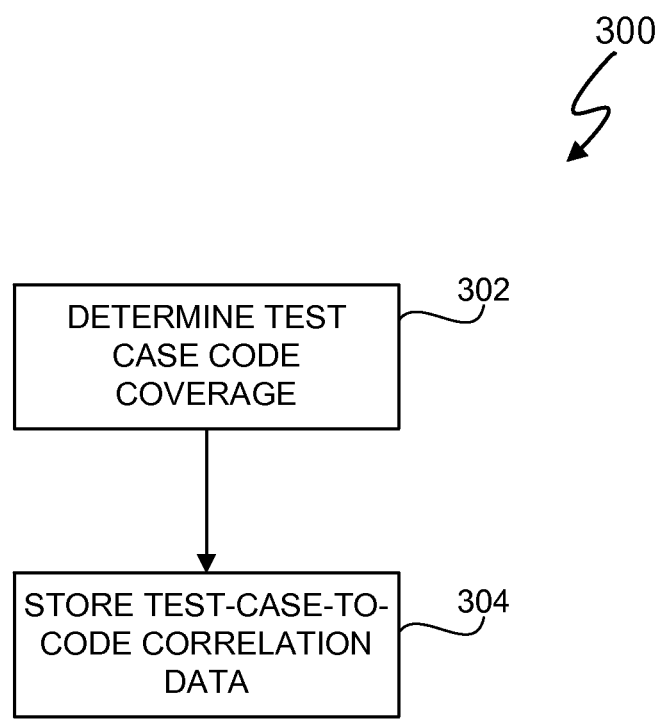
FIG. 3 depicts a test case-to-code correlation process.
Figure 4C:
Figure 4D:
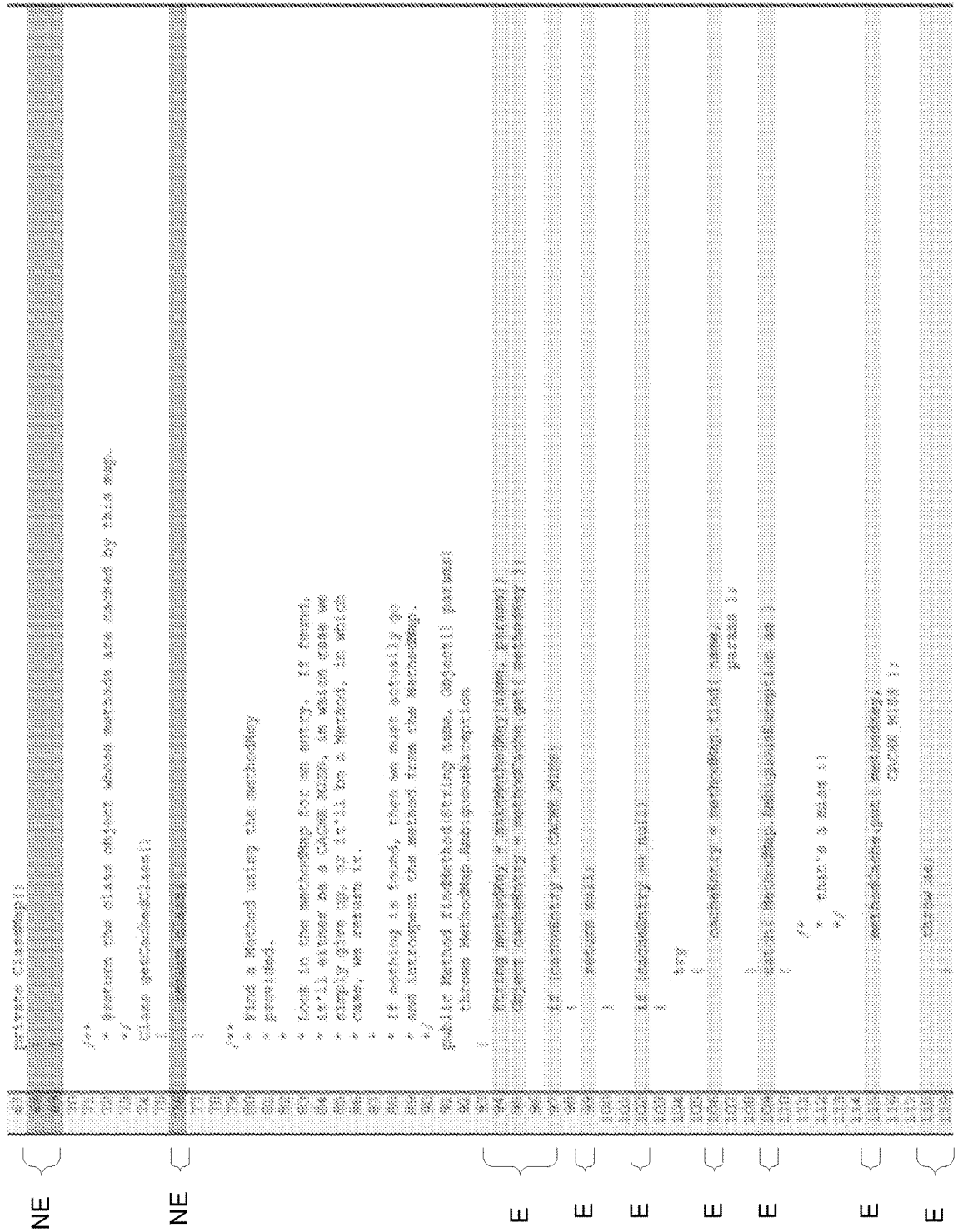
Figure 4E:
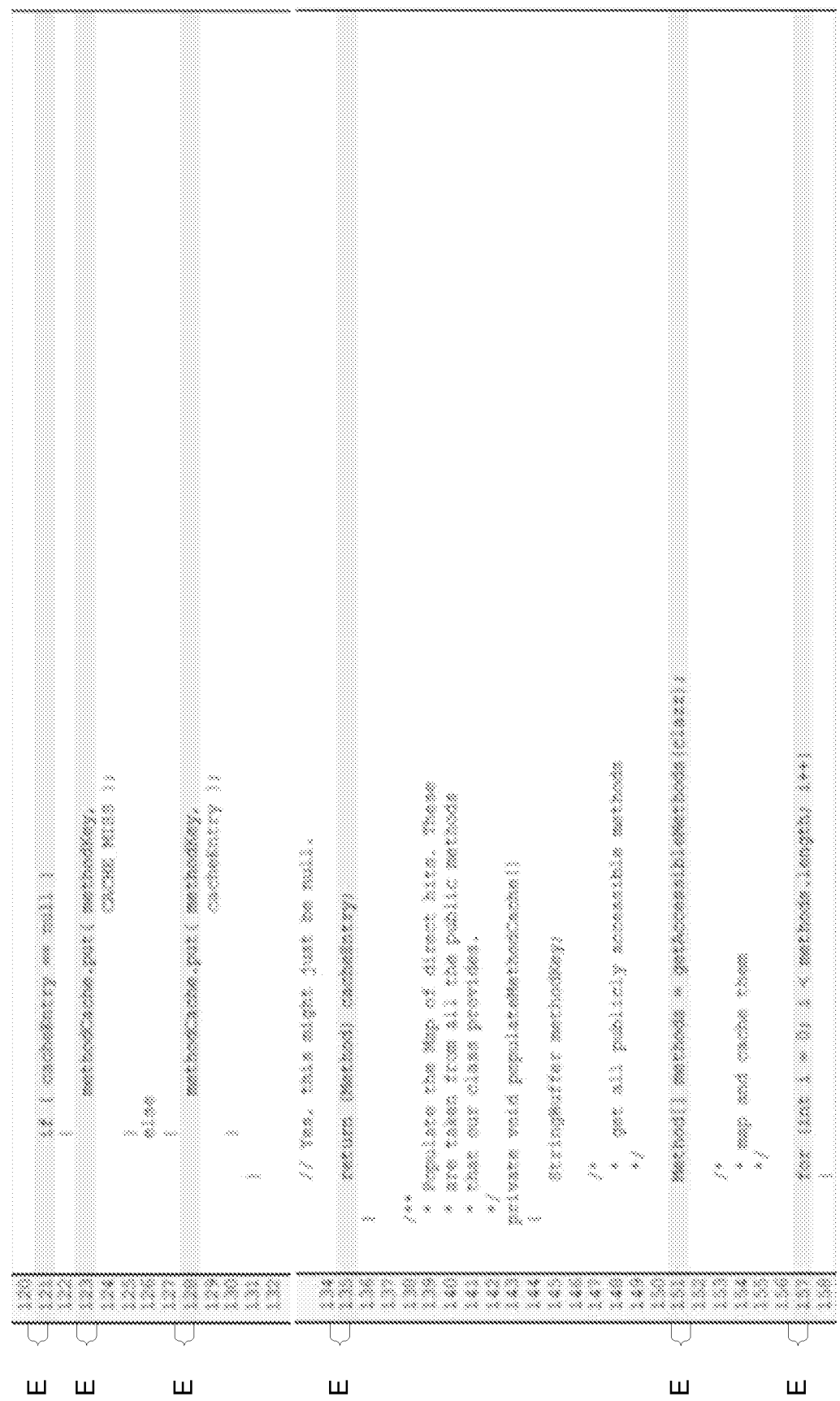
Figure 4G:
Figure 4H:
Figure 4I:
Figure 4J:
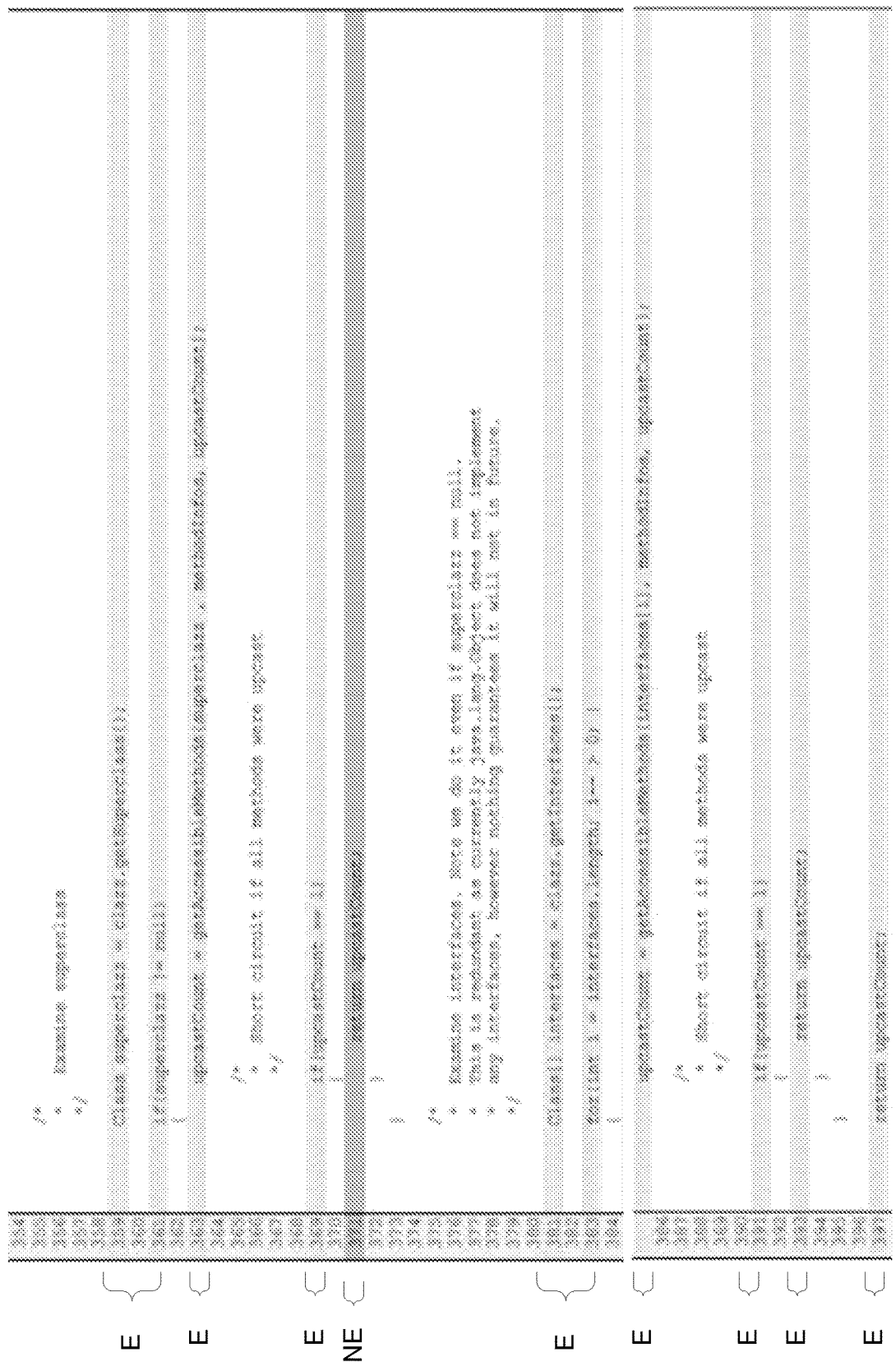
Figure 4K:
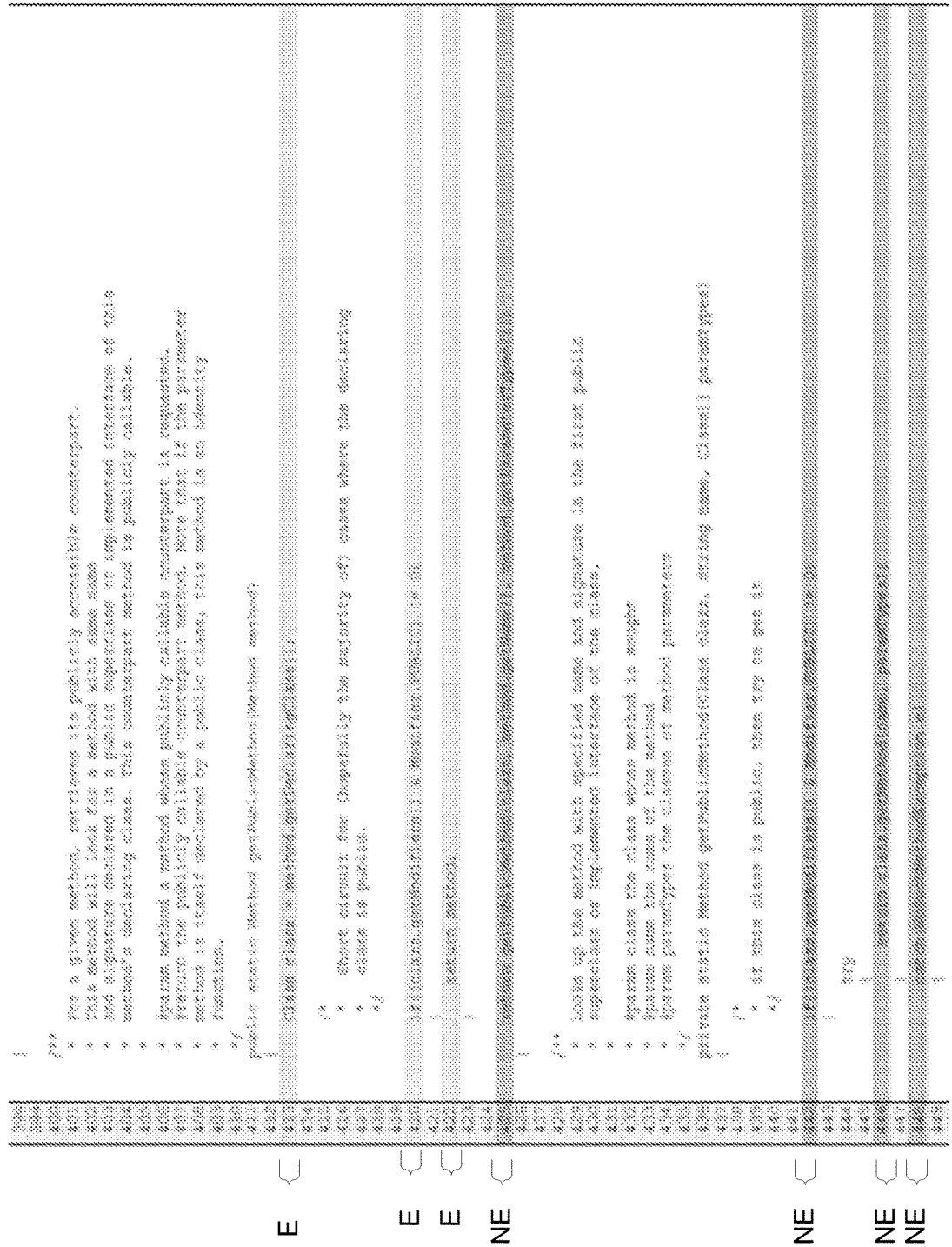
Figure 4L:
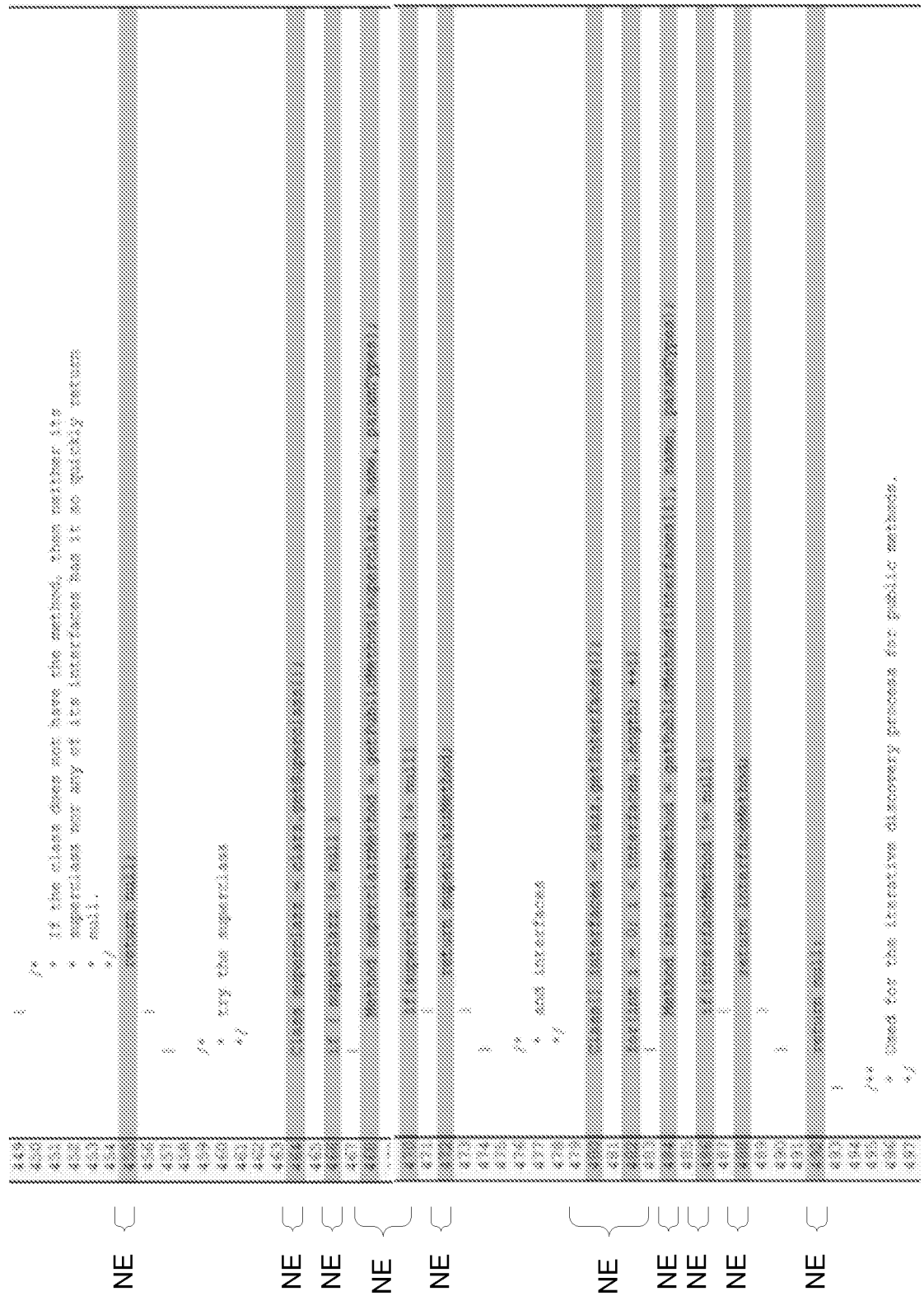
Figure 4M:
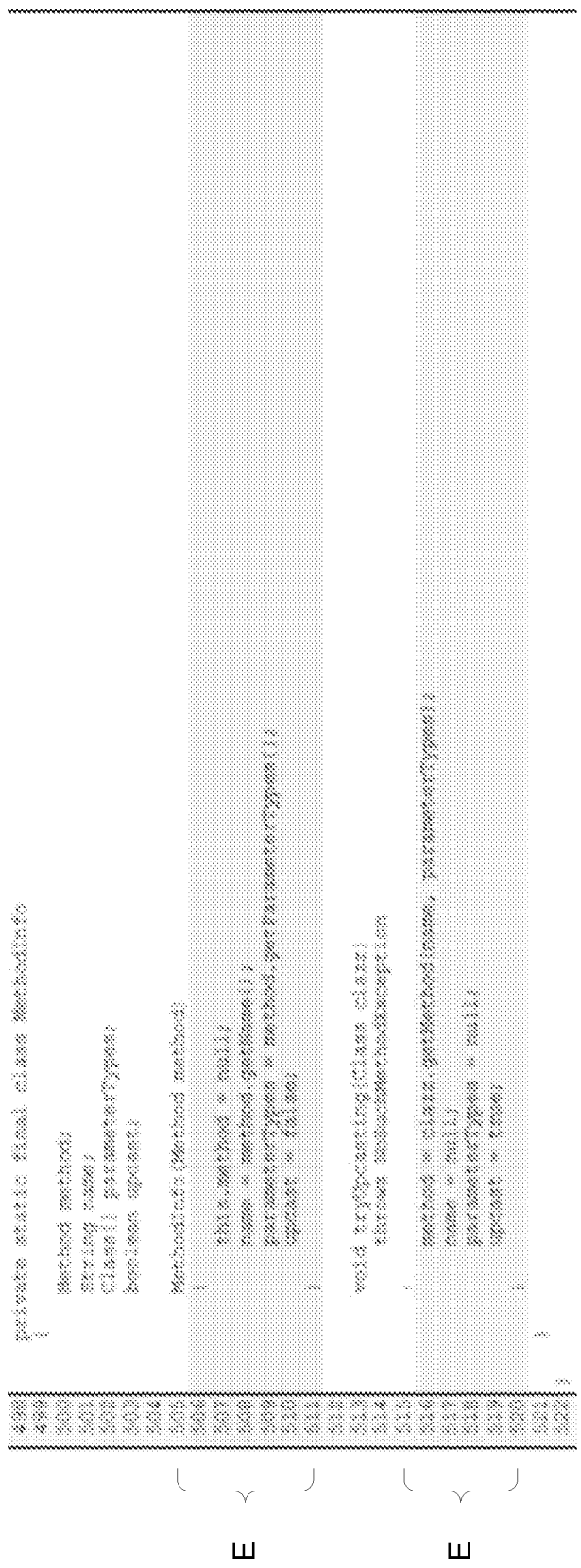

FIG. 3 depicts a test case-to-code correlation process 300, which represents one process for generating the test case-to-code correlation data 212. Referring to FIGS. 2 and 3, operation 302 determines test case code coverage. In other words, operation 302 determines which code in software 204 is exercised by each of test cases 1-N. In at least one embodiment, the computer system 202 utilizes a code coverage application 214 to determine which code is exercised by a test case. Exemplary code coverage applications include EMMA. EMMA is an open source toolkit for measuring and reporting Java code coverage. In at least one embodiment, when the computer system 202 executes a test case against the software 204, the code coverage application 214 determines which code was exercised by the test case. The granularity of code coverage is a matter of design choice. In at least one embodiment, the code coverage application can identify exercised code at one or more levels. For example, for Java-based software, the code coverage application can identify exercised code at line, block, method, class, and/or package levels. The level of granularity for each test case 1-N is a matter of design choice. Thus, the granularity between the test cases 1-N can be the same or can vary between one of more test cases. In a Java programming language context, lines of code makes up a "block" of code, and blocks of code make up a "method". Multiple methods make up a "class", and multiple classes make up a "package". Java is a programming language originally developed by Sun Microsystems of California, USA, which has merged with Oracle Corporation of California, USA.

FIGS. 4A-4M, collectively referred to as FIG. 4, depict an exemplary, partial code coverage determination result by code coverage application 214. FIG. 4A represents an overview of code coverage by an exemplary $i^{th}$ test case$_i$. As indicated by table 402, overall, test case$_i$ exercised 86% of the classes, 62% of the methods, 56% of the blocks, and 58% of the lines of an embodiment of software 204. Table 404 provides a more specific code coverage breakdown by package. For example, in the org.apache.velocity.app.tools package, there was no code coverage by test case$_i$ on a class, method, block, or line level. Thus, test case$_i$ does not correlate to the org.apache.velocity.app.tools package. However, for the package org.apache.velocity.util.introspection, there is 93% class coverage, 83% method coverage, 72% block coverage, and 81% line coverage.

FIG. 4B depicts code coverage by test case$_i$ for classes in the package org.apache.velocity.util.introspection. The package org.apache.velocity.util.introspection has four classes identified in table 406, i.e. ClassMap, ClassMap$1, ClassMap$CacheMiss, and ClassMap #MethodInfo. Each class except ClassMap$1 has code coverage by test case$_i$.

FIGS. 4C-4M depict the code coverage on a method, block, and line level for the class ClassMap. An "E" next to a bracket indicates that the bracketed code was tested by test case$_i$. An "E" next to a bracket indicates that at least part of the bracketed code was tested by test case$_i$. A "NE" next to a bracket indicates that none of the bracketed code was tested by test case$_i$. Lines with delineated between "/**" and "*/" indicated comments, which are not executed.

Referring to FIG. 3, operation 304 of the test case-to-code correlation process 300 then stores the correlation between test case$_i$ and the exercised code indicated in FIG. 4 in the test case-to-code correlation data 212. The test case-to-code correlation process 300 repeats for all other test cases 1-N to generate a complete map of test case-to-code correlation data 212. In at least one embodiment, the test case-to-code correlation process 300 repeats for each new test case added to the test suite 206 and/or upon addition of a new test suite with one or more new test cases. As previously indicated, the granularity of the test-to-code correlation data 212 is a matter of design choice. For example, with regard to the package org.apache.velocity.util.introspection, the granularity can be to correlate at the method level so that if any of the 3 exercised methods ClassMap, ClassMap$CacheMiss, or ClassMap$MethodInfo are modified, then computer system 202 executes test case$_i$. In at least one embodiment, the granularity of the test-to-code correlation data 212 is at the line level so that computer system 202 executes test case$_i$ only when lines of code identified with an E or E' are modified.

Figure 5:
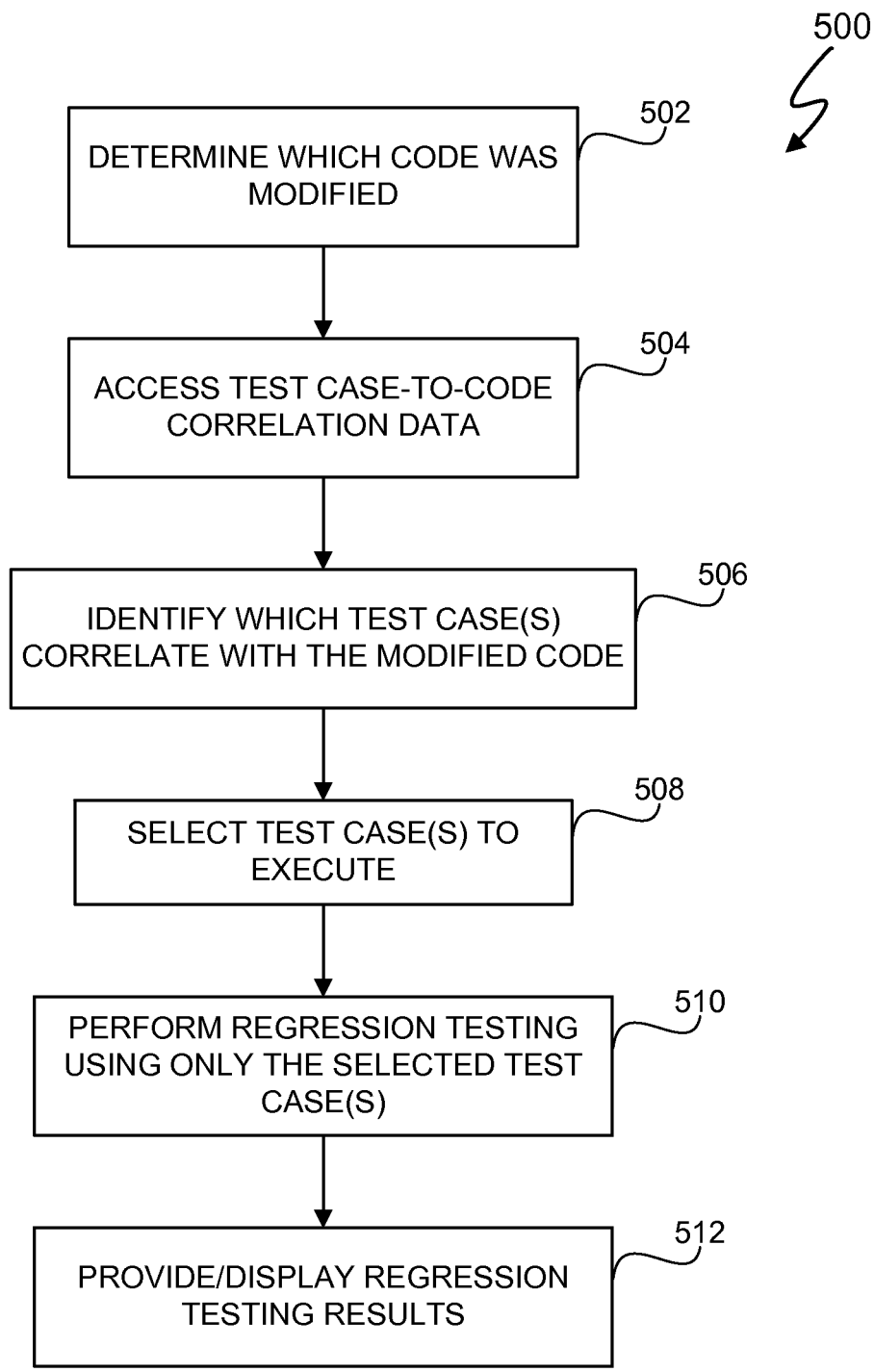
FIG. 5 depicts a selective test case regression testing process.

FIG. 5 depicts a selective test case regression testing process 500. Referring to FIGS. 2 and 5, as previously described, a developer utilizes computer system 216 to modify code 210. In at least one embodiment, code 210 represents code that is part of software 204. The developer performs a code check-in 218. Computer system 216 can communicate with computer system 201 via any means including via a local or wide area network (such as the Internet). Computer system 216 can also be part of computer system 201.

Once computer system 201 notifies computer system 202 that code 210 has been checked in, in operation 502, software 204 is ready for regression testing by the regression testing system 219. Checked code-test case analyzer 220 determines which code in code 210 was modified. In operation 504, the checked code-test case analyzer 220 accesses the test case-to-code correlation data 212, and, in operation 504 identifies which of the one or more test cases in test suite 206 correlate with the one or more portions of code that were modified. In at least one embodiment, operation 504 identifies which of the one or more test cases in test suite 206 correlate with the one or more portions of code that were modified by reviewing the test case-to-code correlation data 212 to identify each test case that tested the modified code. The granularity of the identification process of operation 506 is a matter of design choice. In at least one embodiment, operation 506 identifies test cases based on whether a class in code 210 was modified. Operation 506 can also identify test cases based upon a method, block, or line granularity if the test case-to-code correlation data 212 also supports the level of granularity. Additionally, the granularity of identification can be different for different test cases.

In operation 508, test case selector 222 selects the M selected test cases 224, which were identified in operation 506, for regression testing software 504. "M" is an integer greater than or equal to 1 and less than of equal to N. In at least one embodiment, M is less than N so that the number of test cases 224 used by regression testing process 226 to test software 204 is less than the number of test cases in test suite 206. In operation 510, the computer system 202 performs the regression testing process 226 by testing the software 204 with the M test cases 224. In operation 512, computer system 202 generates the test results data 228. Computer system 202 provides the test results data 228 to another computer system, such as computer system 216, for display and/or storage, stores the test results data 228 in a memory (not shown) for access by one or more computer systems, or directly displays the test results data 228. Additionally, in at least one embodiment, when the test case selector 222 identifies a particular test case, the test case selector 222 iterates through the test cases to determine which test cases are prerequisites to the identified particular test case, and determines which test cases are prerequisites to the determined prerequisite test cases, and so on, so that all test cases and prerequisite test cases are selected. Additionally, in at least one embodiment, the test cases can be divided into subsets and used on different machines to optimize cost, speed, etc.

Figure 6:
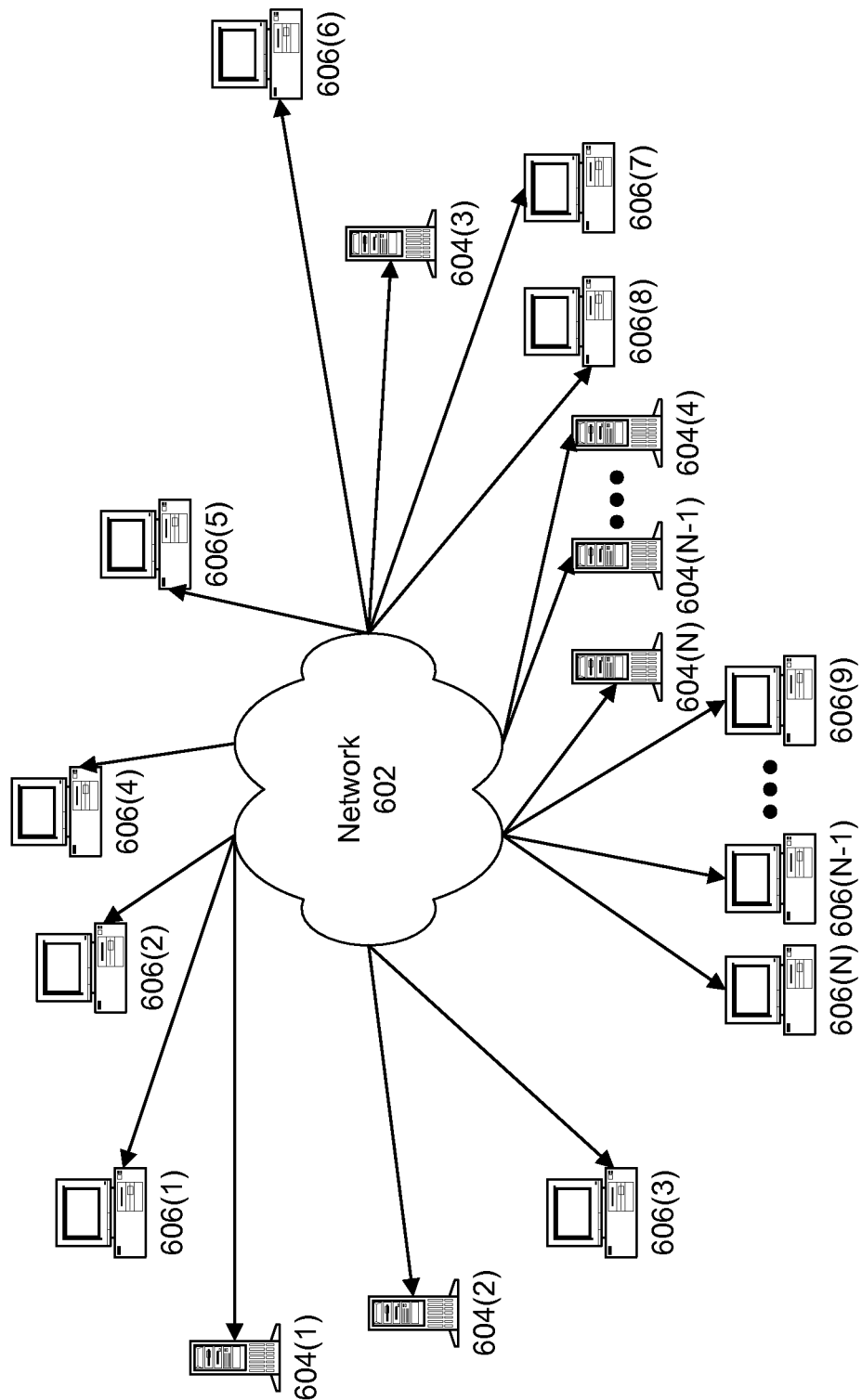
FIG. 6 depicts a block diagram illustrating a network environment.

FIG. 6 depicts a block diagram illustrating a network environment in which a computer software development and testing system 200 may be practiced. Network 602 (e.g. a private wide area network (WAN) or the Internet) includes a number of networked server computer systems 604(1)-(N) that are accessible by client computer systems 606(1)-(N), where N is the number of server computer systems connected to the network.

Communication between client computer systems 606(1)-(N) and server computer systems 604(1)-(N) typically occurs over a network, such as a public switched telephone network over asynchronous digital subscriber line (ADSL) telephone lines or high-bandwidth trunks, for example communications channels providing T1 or OC3 service. Client computer systems 606(1)-(N) typically access server computer systems 604(1)-(N) through a service provider, such as an internet service provider ("ISP") by executing application specific software, commonly referred to as a browser, on one of client computer systems 606(1)-(N).

Client computer systems 606(1)-(N) and/or server computer systems 604(1)-(N) may be, for example, computer systems of any appropriate design, including a mainframe, a mini-computer, a personal computer system including notebook computers, a wireless, mobile computing device (including personal digital assistants). These computer systems are typically information handling systems, which are designed to provide computing power to one or more users, either locally or remotely. Such a computer system may also include one or a plurality of input/output ("I/O") devices coupled to the system processor to perform specialized functions. Mass storage devices such as hard disks, compact disk ("CD") drives, digital versatile disk ("DVD") drives, and magneto-optical drives may also be provided, either as an integrated or peripheral device. One such example computer system is shown in detail in FIG. 7.

Figure 7:
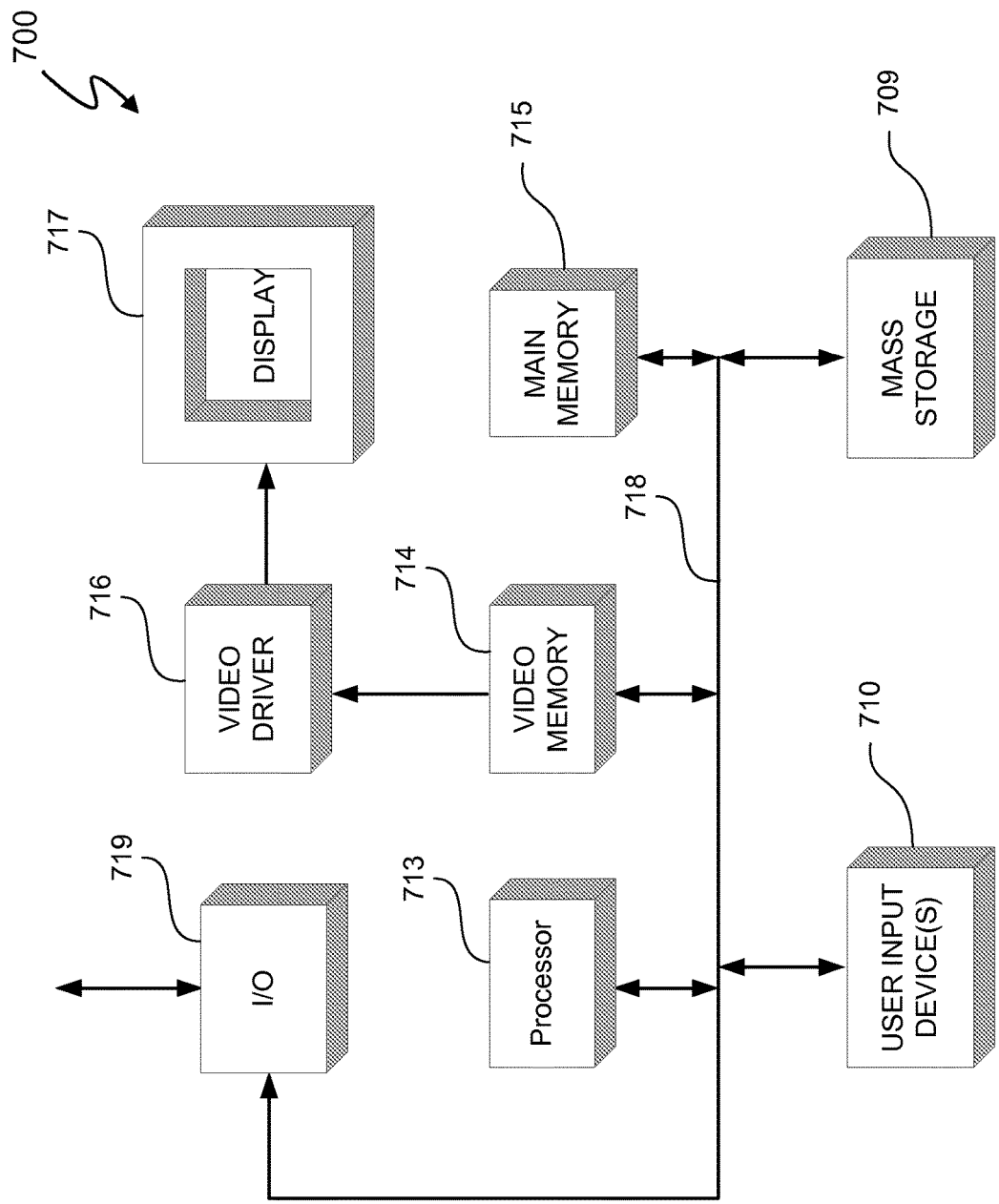
FIG. 7 depicts an exemplary computer system.

FIG. 7 depicts an exemplary computer system 700. Embodiments of the computer software development and testing system 200 can also be implemented purely in hardware using, for example, field programmable gate arrays or other configurable or hard-wired circuits. Embodiments of the computer software development and testing system 200 can be implemented by a computer system such as a general-purpose computer system 700 that is configured with software thereby transforming the general-purpose computer system into a specialized machine for performing the functions set forth in the software. Input user device(s) 710, such as a keyboard and/or mouse, are coupled to a bi-directional system bus 718. The input user device(s) 710 are for introducing user input to the computer system and communicating that user input to processor 713. The computer system of FIG. 7 generally also includes a video memory 714, non-transitory main memory 715 and non-transitory mass storage 709, all coupled to bi-directional system bus 718 along with input user device(s) 710 and processor 713. The non-transitory mass storage 709 may include both fixed and removable media, such as other available mass storage technology. Bus 718 may contain, for example, 32 address lines for addressing video memory 714 or main memory 715. The system bus 718 also includes, for example, an n-bit data bus for transferring DATA between and among the components, such as CPU 709, main memory 715, video memory 714 and mass storage 709, where "n" is, for example, 32 or 64. Alternatively, multiplex data/address lines may be used instead of separate data and address lines. Main memory 715 and mass storage 709 represent embodiments of non-transitory, computer readable media that store software that is executable by a processor.

I/O device(s) 719 may provide connections to peripheral devices, such as a printer, and may also provide a direct connection to a remote server computer systems via a telephone link or to the Internet via an ISP. I/O device(s) 719 may also include a network interface device to provide a direct connection to a remote server computer systems via a direct network link to the Internet via a POP (point of presence). Such connection may be made using, for example, wireless techniques, including digital cellular telephone connection, Cellular Digital Packet Data (CMPD) connection, digital satellite data connection or the like. Examples of I/O devices include modems, sound and video devices, and specialized communication devices such as the aforementioned network interface.

Computer programs and data are generally stored as instructions and data in mass storage 709 until loaded into main memory 715 for execution.

The processor 713, in one embodiment, is a microprocessor manufactured by Motorola Inc. of Illinois, Intel Corporation of California, or Advanced Micro Devices of California. However, any other suitable single or multiple microprocessors or microcomputers may be utilized. Main memory 715 is comprised of dynamic random access memory (DRAM). Video memory 714 is a dual-ported video random access memory. One port of the video memory 714 is coupled to video amplifier 716. The video amplifier 716 is used to drive the display 717. Video amplifier 716 is well known in the art and may be implemented by any suitable means. This circuitry converts pixel DATA stored in video memory 714 to a raster signal suitable for use by display 717. Display 717 is a type of monitor suitable for displaying graphic images.

The computer system described above is for purposes of example only. The computer software development and testing system 200 may be implemented in any type of computer system or programming or processing environment. It is contemplated that the computer software development and testing system 200 might be run on a stand-alone computer system, such as the one described above. The computer software development and testing system 200 might also be run from a server computer systems system that can be accessed by a plurality of client computer systems interconnected over an intranet network. Finally, the computer software development and testing system 200 may be run from a server computer system that is accessible to clients over the Internet.

Embodiments of the computer software development and testing system 200 can also be implemented can be implemented purely in hardware using, for example, field programmable gate arrays or other configurable or hard-wired circuits.

Thus, a system performs regression testing of software using selected test cases. In at least one embodiment, the system selects the test case for regression testing based on whether the test case correlates with modified code.

Although embodiments have been described in detail, it should be understood that various changes, substitutions, and alterations can be made hereto without departing from the spirit and scope of the invention as defined by the appended claims.

What is claimed is:

1. An apparatus comprising:
one or more processors of a first computer system; and
a memory, coupled to the one or more processors, that includes first code stored therein and executable by the one or more processors to perform operations comprising:
receiving a code testing report for computer software, wherein the code testing report is generated by a second computer system, coupled to the first computer system, executing second code stored in a second memory of the second computer system to cause the second computer system to perform:
accessing the code after modification of the multiple portions of the code, which includes modification of multiple classes of the code;
determining which of the multiple portions of the code, including the modified multiple classes, were modified;
accessing data correlating one or more test cases to respective portions of the code, wherein each test case that is correlated to a portion of the code tests the correlated portion of code during a test of the computer software;
identifying one or more correlated test cases, wherein the correlated test cases are the one or more test cases that correlate with the multiple portions of the code, including the modified multiple classes, that were modified;
iterating through multiple test cases to determine which of the multiple test cases are prerequisites to the one or more identified correlated test cases;
continue iterating through the multiple test cases to determine which of the multiple tests cases are prerequisites to the one or more determined prerequisite test cases;
repeating the continue iterating element until all prerequisite test cases are determined;
testing the code using the one or more identified correlated test cases and the one or more determined prerequisite test cases;
generating the code testing report that includes test results of the testing of the code using the one or more correlated test cases and the one or more determined prerequisite test cases; and
providing the code testing report to the first computer system.

2. A non-transitory computer readable medium comprising first code stored therein and executable by a processor to configure a first computer system to perform operations comprising:
receiving a code testing report for computer software, wherein the code testing report is generated by a second computer system, coupled to the first computer system, executing second code stored in a memory of the second computer system to cause the second computer system to perform:
accessing the code after modification of the multiple portions of the code, which includes modification of multiple classes of the code;
determining which of the multiple portions of the code, of the including the modified multiple classes, were modified;
accessing data correlating one or more test cases to respective portions of the code, wherein each test case that is correlated to a portion of the code tests the correlated portion of code during a test of the computer software;

identifying one or more correlated test cases, wherein the correlated test cases are the one or more test cases that correlate with the multiple portions of the code, including the modified multiple classes, that were modified;

iterating through multiple test cases to determine which of the multiple test cases are prerequisites to the one or more identified correlated test cases;

continue iterating through the multiple test cases to determine which of the multiple tests cases are prerequisites to the one or more determined prerequisite test cases;

repeating the continue iterating element until all prerequisite test cases are determined;

testing the code using the one or more correlated test cases and the one or more determined prerequisite test cases;

generating the code testing report that includes test results of the testing of the code using the one or more correlated test cases and the one or more determined prerequisite test cases; and providing the code testing report to the first computer system.

3. The apparatus of claim 1 wherein each portion of the portions of code consist of one or more members of a group consisting of: a line of code, a block of code, a method, a class, and a package.

4. The apparatus of claim 1 wherein the data correlating the one or more test cases to respective portions of the code comprises a map that correlates each test case with the code exercised by the test case.

5. The apparatus of claim 1 further comprising:
executing the second code to cause the second computer system to further perform:
testing the first code in accordance with one of the test cases;
exercising a portion of the first code with the test case used for the testing; and
recording which portion of the first code was exercised by the test case used for the testing.

6. The apparatus of claim 5 wherein exercising the portion of the first code with the test case used for the testing comprises:
calling one or more methods of the code.

7. The apparatus of claim 5 wherein recording which portion of the code was exercised by the test case used for the testing comprises:
storing the portion of the code exercised by the test case used for testing as a data map in a non-transitory, computer readable medium, wherein the data correlating one or more test cases to respective portions of the code comprises the data map.

8. The apparatus of claim 5 further comprising:
executing the second code to cause the second computer system to not test the code using any test cases that do not correlate with the multiple portions of the code that were modified.

9. The apparatus of claim 1 wherein a test case correlates with the multiple portions of the code that were modified if the test case tests all or a proper subset of the multiple portions of the code that were modified.

10. The non-transitory computer readable medium of claim 2 wherein each portion of the portions of code consist of one or more members of a group consisting of: a line of code, a block of code, a method, a class, and a package.

11. The non-transitory computer readable medium of claim 2 wherein the data correlating the one or more test cases to respective portions of the code comprises a map that correlates each test case with the code exercised by the test case.

12. The non-transitory computer readable medium of claim 2 further comprising:
executing the second code to cause the second computer system to further perform:
testing the first code in accordance with one of the test cases;
exercising a portion of the first code with the test case used for the testing; and
recording which portion of the first code was exercised by the test case used for the testing.

13. The apparatus of claim 12 wherein exercising the portion of the first code with the test case used for the testing comprises:
calling one or more methods of the code.

14. The apparatus of claim 12 wherein recording which portion of the code was exercised by the test case used for the testing comprises:
storing the portion of the code exercised by the test case used for testing as a data map in the non-transitory, computer readable medium, wherein the data correlating one or more test cases to respective portions of the code comprises the data map.

15. The apparatus of claim 12 further comprising:
executing the second code to cause the second computer system to not test the code using any test cases that do not correlate with the multiple portions of the code that were modified.

16. The non-transitory computer readable medium of claim 2 wherein a test case correlates with the multiple portions of the code that were modified if the test case tests all or a proper subset of the multiple portions of the code that were modified.

* * * * *